Sept. 21, 1926.  
C. R. BEALL  
CENTRIFUGAL DEVICE  
Filed March 13, 1923  
1,600,788

INVENTOR:  
C. R. Beall,  
BY A. R. Vencill  
His ATTORNEY

Patented Sept. 21, 1926.

1,600,788

UNITED STATES PATENT OFFICE.

CHARLES R. BEALL, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

CENTRIFUGAL DEVICE.

Application filed March 13, 1923. Serial No. 624,872.

My invention relates to centrifugal devices, and particularly to devices of the type in which a member is controlled in accordance with the speed of a rotatng shaft by centrifugal force.

I will describe one form of centrifugal device embodying my invention, and will then point out the novel features thereof in claims.

Figure 1:
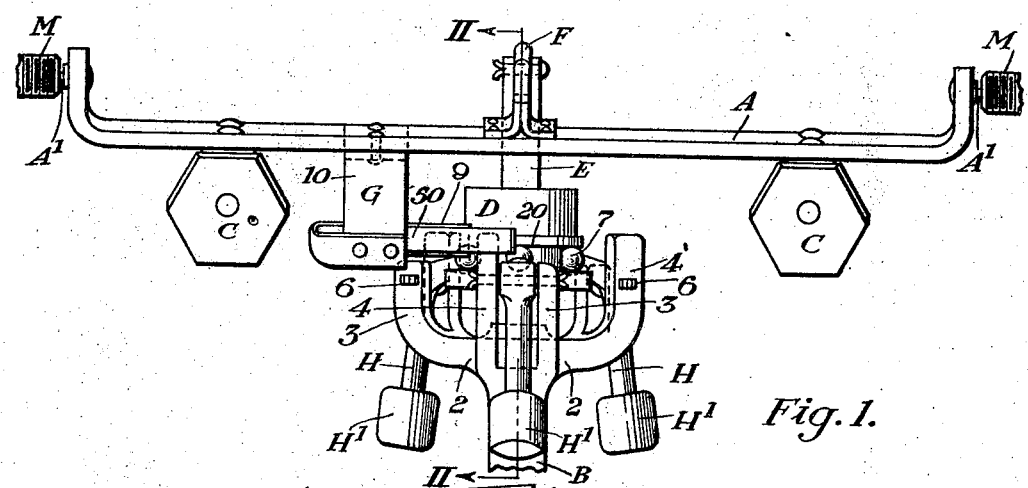
Figure 2:
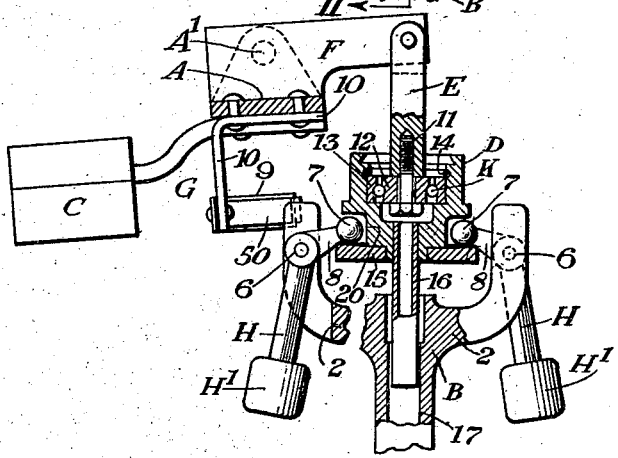
Figure 3:
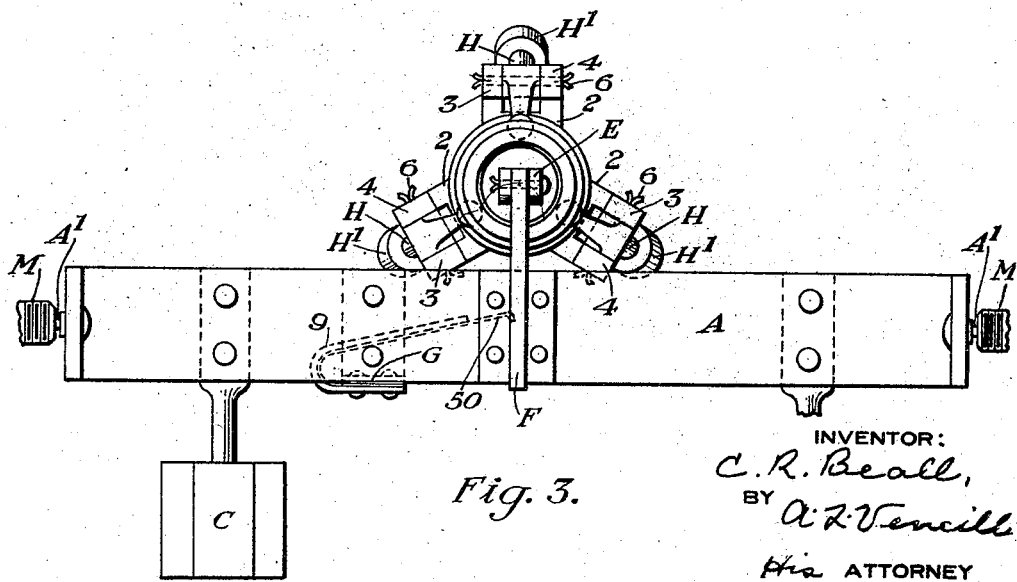

In the accompanying drawings, Fig. 1 is a view showing in front elevation one form of centrifugal device embodying my invention. Fig. 2 is a sectional view on the line II—II of Fig. 1. Fig. 3 is a top view of the centrifugal device shown in Figs. 1 and 2.

Similar reference characters refer to similar parts in each of the three views.

Referring to the drawings, the reference character B represents a tubular shaft or spindle which may be caused to rotate by means not essential to the complete disclosure of my invention and omitted from the drawings for the sake of simplicity. Upwardly extending from this spindle are three yokes 2 each of which terminates in two fingers 3 and 4 between which a member H is supported by a pin 6. Each member H comprises a weight H', and a projecting arm 8 terminating in a ball 7. When the spindle B is rotated centrifugal force tends to throw weights H' away from the axis of rotation, thus raising these weights and depressing the arms 8 and balls 7. Attached to a hollow shaft 16 inserted in spindle B is a cylindrical block D provided with an annular groove 20 one side of which is formed by a bearing plate 15 or some wear resisting material. The balls 7 rotate in this groove 20 and when depressed they engage the bearing plate 15 and move block D downwardly. The outer race 13 of a ball bearing K is rigidly fastened to block D by means of an expanding ring 14 in a suitable recess in the top of the block. A vertically extending link E is secured to the inner race 12 of bearing K by means of a screw 11.

The upper end of link E is pivotally connected to an arm F which is attached to a bar A. The ends of this bar are upturned and are provided with pivot studs A' by means of which the bar may be pivotally mounted to swing in trunnion screws M. The bar A is also provided with two weights C. By virtue of the force of gravity upon these weights the mechanism is biased to a position wherein the right hand side of bar A as viewed in Fig. 2 is tipped upward. It will be seen that movements of the three weights H' away from the longitudinal axis of spindle B will cause bar A to rotate in its trunnion screws M in a clockwise direction as seen in Fig. 2 against the bias exerted by weights C. This movement of the bar may be employed to accomplish any desired result.

It will be observed that since the balls 7 operate freely in a continuous groove the wear on these parts is evenly distributed and not concentrated at any single point. In my invention block D either may or may not turn with the spindle B depending on whether the friction between the balls 7 and the bearing plate 15 is greater or less than the friction of the ball bearing K. Excessive wear of the moving parts sometimes results from the lack of concentricity between the block D and the spindle B. In my invention I make the bearing plate 15 saucer-shaped, that is, having its outside edge higher than its more central portions. The result of this is that when the three centrifugal arms H force the balls 7 into engagement with this plate at three equidistant points on its surface, the tendency of the block is to assume a position in which its vertical axis coincides with the axis of rotation of the spindle B.

With only the apparatus thus far described the centrifuge device is capable of being rotated in either direction. In order to prevent rotation in one direction I construct the finger 4 of each yoke 2 of spindle B in such manner that it will extend further above the point of attachment of centrifuge arm H than finger 3 of the corresponding yoke as best shown in Fig. 1. I also provide a pawl device G on the bar A which comprises a suitable support 10 carrying a spring arrangement comprising two fingers 50 and 9 of thin spring material. This pawl G is so disposed that when the bar A is in the position corresponding to the position of rest of weights H', the spring finger 50 of pawl G engages with the fingers 4 to prevent rotation of spindle B in one direction, namely, in a clockwise direction, as viewed in Fig. 3. As the spindle B is rotated in the opposite direction spring 50 of pawl G is flexed by each successive arm 4 till the speed of the device reaches a value at which the centrifugal force on weight H' tips bar A on its pivots a sufficient amount to move the pawl device completely out of the path of the fingers 4. In other words, when the centrifugal device is rotating counter-clockwise as seen in Fig. 3, the pawl springs do not touch the fingers 4 after a small velocity has been attained so that the device then offers no resistance to the rotation of spindle B and is noiseless.

Centrifugal devices of the type described herein are particularly well adapted for, though in no way limited to, application in railway signaling relays comprising a motor device, a centrifugal device operated thereby, and contact mechanism controlled by said centrifugal device.

Although I have herein shown and described only one form of centrifugal device embodying my invention, it is understood that various changes and modifications may be made therein within the scope of the appended claims without departing from the spirit and scope of my invention.

Having thus described my invention, what I claim is:

1. In combination, a rotatable spindle having three upstanding fingers, a block, means operably connected with said fingers for moving said block in response to the speed of said spindle, an auxiliary member normally biased to a position in the path of said fingers and means operably connected with said block for moving said member away from such position.

2. In combination, a rotatable spindle, a block having an annular groove therein, three members operably connected with said spindle and having projecting arms terminating in balls adapted to enter said groove and the positions of which are dependent upon the speed of said spindle, and a pawl device controlled by said block for preventing rotation of said spindle in one direction.

In testimony whereof I affix my signature.

CHARLES R. BEALL.